Jan. 31, 1967   J. H. STOVER III   3,301,298
FLANGED LOCK NUT
Original Filed July 19, 1965

INVENTOR.
JORDAN H. STOVER, III
BY
Davis, Hoxie, Faithfull & Hapgood
ATTORNEYS.

3,301,298
FLANGED LOCK NUT
Jordan H. Stover III, Bloomfield Hills, Mich., assignor to The Lamson and Sessions Company, Cleveland, Ohio, a corporation of Ohio
Continuation of application Ser. No. 473,097, July 19, 1965. This application July 6, 1966, Ser. No. 565,043
1 Claim. (Cl. 151—21)

This is a continuation of application Serial No 473,097, filed July 19, 1965, now abandoned which was a continuation-in-part of application Serial No. 378,354, filed June 26, 1964 (now Patent No. 3,198,230, dated August 3, 1965), the latter application being a continuation-in-part of application Serial No. 96,216, filed March 16, 1961, and now abondoned.

This invention relates to flanged lock nuts and particularly to such nuts of the prevailing torque-type made by compressing a flanged nut on two opposite sides at the top of the nut.

Lock nuts of the prevailing torque type described above have been used extensively and have advantages for many different applications, an example of such a nut being disclosed in U.S. Patent No. 2,464,729 dated March 15, 1949. However, such lock nuts as made heretofore have had several disadvantages, as follows:

(1) The assembly poorly on the bolts. That is, when a minimum tapped nut made to commercial tolerance is compressed at the top sufficiently to produce prevailing torque on a minimum threaded bolt made to commercial tolerances, the nut tends to distort over its entire length in standard nut heights. Thus, it cannot be mated with a maximum external thread gauge and causes extreme difficulty with thread start on maximum threaded bolts made to commercial tolerances, and increases cross threading tendencies.

(2) They fit poorly in socket-wrenches. When a commercial tolerance hexagonal nut having a maximum width across flats is compressed as described above, the two unrestrained corners tend to protrude, and the nut cannot be fitted to a standard minimum socket.

(3) They cannot be readily hopper-fed in automated assemblies. Insufficient difference between top and bottom prevents rapid inexpensive hopper feeding so that each nut can automatically be put on the bolt right side up.

(4) They tend to freeze or gall on the bolts. When a minimum tapped nut is compressed as described above, it tends to freeze or gall and produces excessively high prevailing torques, particularly when screwed on a maximum size commercial thread bolt with a power wrench.

(5) The produce extremely wide variations in clamp force when tightened against the work on bolts at a given torque. When a minimum tapped nut is compressed as described above, it tends to give extremely low clamp force; and if it galls, the clamp force may be zero. Low clamp forces tend to fatigue or break or damage bolts when subjected to continuous vibration and shock. On the other hand, a maximum tapped nut when so compressed tends to create substantially higher clamp force when tightened on the bolt to a given torque. These extremely high clamp forces may yield or break or strip the bolt.

(6) They produce too stiff a locking spring. In a lock nut made as described, the entire wall of the nut is used as a spring to provide pressure on two opposite sides of the bolt so that a suitable lock, or prevailing torque, will result on both a maximum pitch diameter bolt and a minimum pitch diameter bolt. If this spring is too stiff, or the spring rate too low, an extremely wide prevailing torque scatter band will result from one nut and bolt combination to another, A maximum pitch diameter bolt when mated with a minimum pitch diameter tapped nut will give an extremely high prevailing torque and may even gall, while a minimum pitch diameter bolt when mated with a maximum pitch diameter tapped nut will give extremely low prevailing torque.

(7) The locking action of the nut may be lost when the nut is tightened sufficiently to develop 75 percent of the proof load of the bolts. If the amount of locking compression and, in turn, the prevailing torque of a maximum torerance tapped nut is low, the tapped threades in the nut will tend to be stranghtened out by the clamp forces which act at right angles to the axis of the bolt through the 60° angles on the flanks of the thread when the nut is mated with a minimum tolerance threaded bolt and tightened to produce a clamp force on the bolt equal to 75% of proof loads. A lock nut in which the spring is to stiff should be made with low compression and low prevailing torque in order to prevent galling when a minimum tapped nut is mated with a maximum threaded bolt. This also results in the thread bearing area of the locking section in the nut being a minimum. Because of this minimum bearing area, problems will result because wear is concentrated on the minimum locking contact area. For example, when the maximum tolerance tapped nut is run onto a minimum tolerance threaded bolt with a high speed power wrench, the friction is concentrated onto a small bearing area, and may cause complete loss of locking action because of the frictional wear, particularly when two or more nut heights of the bolt protrude through the nut.

As disclosed in my said Patent No. 3,198,230, I have discovered that these disadvantages can be largely or entirely overcome by precisely compressing, across two opposite sides, a specially constructed nut blank manufactured to special tolerances and by treating with a special lubricant the lock nut thus formed. The resulting lock nut of my invention provides a consistant variable-rate spring locking action which produces consistent prevailing torque on bolts of both maximum and minimum pitch diameter and on bolts where the threads deviate in other ways from a perfect thread, such as in lead and profile. The new nut also produces more consistent clamp loads on bolts at a given torque when tightened to more then 50 percent of the proof load of the bolt, as compared with standard nuts and the nut of the aforesaid patent. It also produces the same clamp load at a lower torque. It can be easily fitted in standard wrenches, easily started on bolts, and will not freeze or gall when tightened or run down with conventional power wrenches. It maintains its locking action over five removals, is readily adapted to automatic feeding, and will develop more tightening strength in its mating bolt.

The lock nut of the present invention embodies features disclosed and claimed in said Patent No. 3,198,230 and is further characterized in that the nut body has an integral external flange at the bottom forming an enlarged annular bearing face. The purpose of this enlarged bearing face is to resist loosening of the bolted joint due to progressive embedment of the nut into a softer material or surface of the joint. This embedment is sometimes called indention or brinelling, and it is caused by exceeding the compressive yield strength of the joint material.

When a bolted joint (parts clamped together by a nut and bolt) is subjected to dynamic loading caused by vibration or shock, some of the external load is additive to the preload in the bolt. This addition load usually causes a further embedment of a standard nut into the joint surface and permanent clamp force loss which may become progressive. For example, a ⅜–24 standard finished hex nut has a bearing area of approximately .137 square inch. A ⅜–24 SAE grade 5 bolt has a proof load of 7450 pounds. When two ⅛" thick sections of mild steel SAE 1010 are bolted together with a standard nut, and the nut is tightened so as to produce a clamp force of 75 percent of the proof load of this bolt (good tightening practice), the clamp load in the joint and the load in the bolt will be 5600 pounds. This load will result in a bolt stretch of .000533 of an inch. Under these conditions a load of 5600 pounds on a standard nut, with a bearing surface area of .137 square inch, results in a stress of 41,000 pounds per square inch. This stress exceeds the compressive yield strength of 1010 mild steel, which is approximately 25,000 pounds per square inch. Thus when the standard nut is initially tightened, it has already embedded into the joint surface. This embedding will cease when the joint surface has been cold worked sufficiently to withstand the above stress level. When these two 1/8" sections are subjected to dynamic loads which result in an additional bolt load of 500 pounds above the preload, this will cause a further embedment of the standard nut into the joint surface. If this further embedment is .0001 of an inch, then the permanent loss in clamp force will be 1050 pounds, which is 18¾ percent of the initial clamp force.

It is known in the art that such embodiment or brinelling can be resisted by providing the nut with a bottom flange. However, the provision of the bottom flange on the nut of said Patent No. 3,198,230 presents a problem. More particularly, when the specially constructed nut blank is formed with an integral bottom flange, the latter will normally affect the result of permanently distorting the nut by squeezing it across opposing flats as disclosed in the patent. That is, while the bottom part of the nut acquires no significant permanent distortion, its degree of rigidity affects the permanent distortion of the nut elsewhere in response to the squeezing and also affects the subsequent elastic distortion of the nut when it is applied to the bolt; and the degree of such rigidity of the bottom part is affected, in turn, by the shape and dimensions of the bottom flange. In other words, without an understanding of these interrelated factors and without proper dimensioning and shaping of the bottom flange to take them into account, the addition of the bottom flange to said patented lock nut could easily negate the optimum results attained by the nut as disclosed in the patent.

The present invention solves the above-mentioned problem and stems from my discovery that in providing the lock nut of my said Patent No. 3,198,230 with an integral bottom flange to give adequate resistance against the aforesaid embedment or brinelling, the optimum results attained in the use of that patented nut are retained if the flanged nut has certain characteristics, as follows:

(a) The upper surface of the bottom flange slopes upwardly and inwardly toward the vertical flats of the nut and makes an angle of approximately 25 degrees with the bottom bearing face of the nut.

(b) The bottom flange has an outer diameter of at least 2d, where D is the nominal size of the nut (the nominal diameter of the mating bolt).

(c) The thickness of the bottom flange, as measured at a diameter which is double the nominal size of the nut (that is, as measured at the minimum outer diameter specified in (b) above), is at least about 0.16 of the nominal size of the nut.

(d) The lowest extent of each compression indentation across opposed vertical flafts is spaced below the plane of the top of the upper cone by a distance equal approximately to one-third of the difference between the nut body height and the thickness of the bottom flange as specified in (c) above.

(e) The minimum height of the nut body is substantially greater than in the case of said patented nut. For example, the flanged nut body height is at least about .274 inch as against a minimum of about .210 inch for the patented nut, in the ¼ inch nominal size. Moreover, this minimum height increases to the extent that the aforesaid flange thickness exceeds 0.16 of the nominal size of the nut.

According to the present invention in its preferred form, the flange on the bottom of the shelf-locking nut is constructed so that it can be cold headed and is of such a diameter that the maximum bearing area stress will not exceed 25,000 pounds per square inch (the compressive yield strength of SAE 1010 mild steel) when loaded to the proof load of SAE grade 5 bolts, considering the bolt clearance hole to be 1/32 inch larger than the nominal bolt diameter. The flange is also constructed so that it will not take a permanent set when fully loaded to the proof load of SAE grade 5 bolt. Thus, with a flanged self-locking nut of this invention, essentially no embedment will occur when the nut is initially tightened nor will any further embedment occur when external forces are applied to the joint which result in an increased bolt load, providing that the total bolt load does not exceed the bolt proof load of SAE grade 5 bolts, and providing that the bolt head bearing area or the bearing area under the bolt head is sufficient also to prevent embedment.

The invention will be described more particularly in the following detailed description in conjunction with the accompanying drawings, in which.

Figure 1:
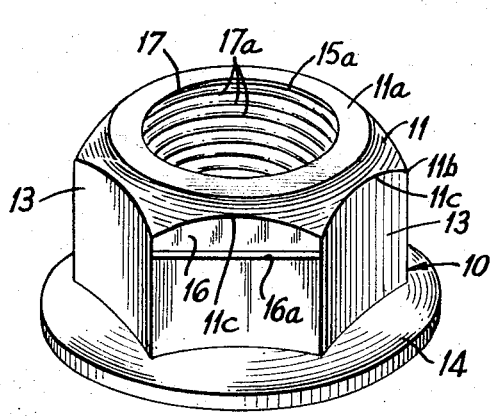
FIG. 1 is a perspective view of a flanged lock nut made according to the invention.
Figure 2:
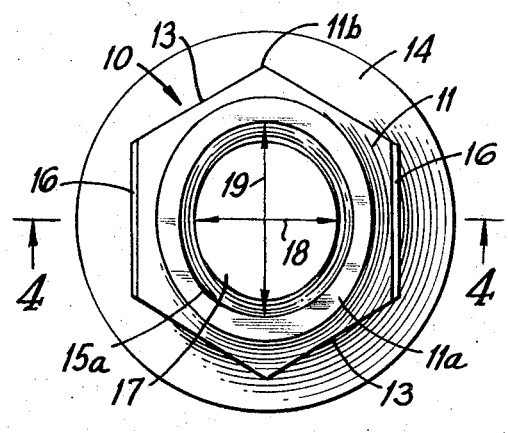
FIGS. 2 and 3 are views of the top and bottom, respectively, of the nut shown in FIG. 1.
Figure 4:
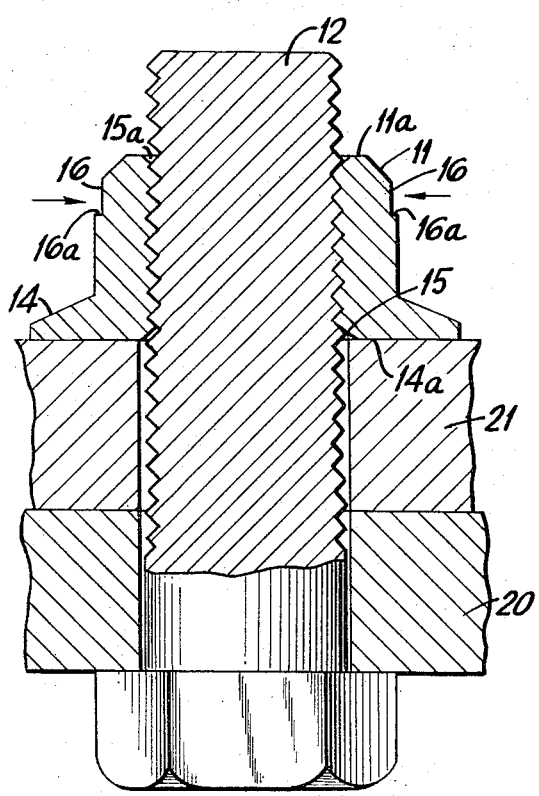
FIG. 4 is a vertical sectional view of an assembly including the nut, its mating bolt, and two parts held together by the nut and bolt, the nut section being on the line 4—4 in FIG. 2.
Figure 3:
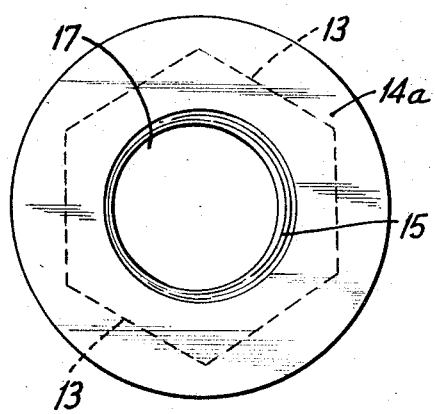

The nut as illustrated is made from a nut blank 10 formed at the top with a truncated cone 11 tapering upwardly from the main hexagonal body of the blank. Before distortion of the nut blank as hereinafter described, the external diameter of the truncated cone 11 at its smaller or upper end is 1.20D minimum to 0.015 inch plus 1.20D maximum, where D is the nominal diameter of the mating bolt 12 in inches (FIG. 4). The angle between the bolt axis and the tapering side wall of the cone is about 45°, preferably 45° plus/minus 2°.

The width across opposing flats 13 of the hexagonal portion of the nut blank is controlled. For example, for nuts ⅜", ½", ⅝", the width across flats will be according to the formula 1.485D plus 0.006 to 0.012 inch and for nuts having diameters of ¾", ⅞", 1", etc., the width across flats will be according to the formula 1.450D to 1.450D plus 0.018 inch. In all cases D is the nominal diameter of the mating bolt in inches. The specified width across the flats is in the lower half of the tolerance range for finished hexagon nuts specified by "American Standard Square and Hexagon Nuts and Bolts" (A.S.A.B. 18.2, 1960). The standards width is specified on page 17 of this publication published by The American Society of Mechanical Engineers, New York, New York, and the widths for the typical nut blanks of the present invention are tabulated in the following Table 1, the dimensions being in inches and based on the lower half of the aforesaid tolerance range.

*Table 1*

| Nominal Size or Basic Major Diameter of Thread | Standard Width Across Flats | Present Width Across Flats |
|---|---|---|
| ¼ | .428 to .4375 | .428 to .4328 |
| 5/16 | .489 to .500 | .489 to .4945 |
| ⅜ | .551 to .5625 | .551 to .5567 |
| 7/16 | .675 to .6875 | .675 to .6812 |
| ½ | .736 to .7500 | .736 to .743 |
| 9/16 | .861 to .8750 | .861 to .868 |
| ⅝ | .922 to .9375 | .922 to .9297 |
| ¾ | 1.088 to 1.125 | 1.088 to 1.1065 |
| ⅞ | 1.269 to 1.3125 | 1.269 to 1.291 |
| 1 | 1.450 to 1.50 | 1.45 to 1.475 |
| 1⅛ | 1.631 to 1.6875 | 1.631 to 1.659 |
| 1¼ | 1.812 to 1.875 | 1.812 to 1.843 |
| 1⅜ | 1.994 to 2.0625 | 1.994 to 2.028 |
| 1½ | 2.175 to 2.250 | 2.175 to 2.212 |

Thus, for the present new lock nut the width across flats of the nut blank, as indicated by the right-hand column above, is hereinafter referred to as being within the lower half of the range of widths across flats for standard finished hexagon nuts. This confinement of the width to the lower half of the range is necessary because otherwise a standard socket wrench will not receive the upper portion of the nut after the blank has been distorted by the amount to be described presently.

At its lower end, the nut blank 10 is provided with an integral external flange 14 so that the bottom of the nut forms an enlarged annular bearing face 14a surrounding the threaded hole through the nut. The bearing face 14a is smooth and flat, or possibly slightly concave, and is within one degree of being normal to the axis of the threaded hole. From the circular periphery of the flange 14, its upper surface slopes upwardly and inwardly to the corners formed by the flats 13, this upper surface having an angle with the bottom bearing face 14a of approximately 25 degrees. The outer diameter of flange 14 is at least double the nominal size of the nut, as described more fully hereinafter, and the minimum thickness of the flange when measured at this minimum outer diameter is according to the following Table 2.

Table 2

| Nominal size of nut (inches): | Minimum flange thickness (inches) |
|---|---|
| 3/16 | .030 |
| 7/32 | .035 |
| 1/4 | .040 |
| 5/16 | .050 |
| 3/8 | .060 |
| 7/16 | .070 |
| 1/2 | .080 |
| 9/16 | .090 |
| 5/8 | .100 |

Thus, the flange thickness, as measured at a diameter of the flange which is double the nominal size of the nut, is at least 0.16 of the nominal size of the nut. If the flange thickness is less than this minimum, it lacks the desired rigidity; and a thickness substantially greater than this minimum entails unnecessary additional metal and extra height of the nut.

The over-all height of the nut is such as to provide adequate wrenching flats after provision for the flange 14 and the conical shaped top 11. The minimum overall height, for the minimum flange thickness described above, is according to the following Table 3, it being understood that such minimum height is increased by the amount which the aforesaid flange thickness exceeds the minimum of 0.16 of the nominal size of the nut.

Table 3

| Nominal size of nut (inches): | Minimum over-all height |
|---|---|
| 3/16 | .242 |
| 7/32 | .265 |
| 1/4 | .274 |
| 5/16 | .339 |
| 3/8 | .396 |
| 7/16 | .460 |
| 1/2 | .522 |
| 9/16 | .584 |
| 5/8 | .646 |

The minimum outer diameter of flange 14 is determined as previously explained and is according to the following Table 4.

Table 4

| Nominal size of nut (inches): | Minimum flange diameter |
|---|---|
| 3/16 | .433 |
| 7/32 | .505 |
| 1/4 | .505 |
| 5/16 | .612 |
| 3/8 | .735 |
| 7/16 | .857 |
| 1/2 | .988 |
| 9/16 | 1.116 |
| 5/8 | 1.241 |

Thus, the outer diameter of the flange is at least about double the nominal size of the nut.

The end of the threaded hole adjacent the bearing face 14a of the nut blank and the upper end of the hole may be countersunk to a diameter which is at least the major diameter of the nut thread and no more than this major diameter plus 1/32 inch, as shown at 15 and 15a, each countersink forming a cone frustum with its surface at an angle if about 45° to the axis of the threaded hole. At the lower or bearing face of the nut the wider end of the frustum is, of course, at the bottom to facilitate application of the nut to the mating bolt.

The threads in the special nut blank are tapped to such a minimum pitch diameter that the bearing end of the nut will accept at least one full turn of a maximum threaded mandrel as specified in Table VI of "Specifications for Hexagon Locknuts Prevailing-Torque Type Steel" published May 28, 1958, by Industrial Fasteners Institute, after the blank has been compressed across opposing flats as described hereinafter. The maximum pitch diameter of the threads is such that they will support-without failure the axial load for grade 5 bolts as specified in Table IV for lock nuts, in the last-mentioned publication, after such compression across the flats.

In accordance with my invention, for nuts in the fine-thread series (UNF) as defined in "Unified Screw Threads," ASA B1.1, published in 1960 by The American Society of Mechanical Engineers, the formula for the pitch diameter (in inches) of the threads in the central hole through nut blank 10 is as follows:

$$\text{Min. } P \cdot D = M + K/hn$$

where M is the minimum pitch diameter of the UNF thread as shown in Table 2.1 of the above-noted ASME publication for class 3B nuts; K is 0.0000521; and $hn$ is the depth of thread engagement as shown in column 11 of Table 13 on page 62 of the latter publication.

$$\text{Max. } P \cdot D = \text{Min. } P \cdot D + T$$

where T is the tolerance for the pitch diamter of the UNF thread as shown in said Table 2.1 for class 3B nuts. Thus, for a 1/4–28 nut, for example:

Min. $P \cdot D = .2268 + .0000521/.01933$ $= .2268 + .0027$ $= .2295''$

Max. $P \cdot D = .2295 + .0032$ $= .2327$

For nuts in the coarse-thread series (UNC) as defined in this ASME publication, the formula for the pitch diameter (in inches) of the threads is the same as above except, of course, that the minimum pitch diameter (M) is that of the UNC thread, the tolerance (T) is that for the pitch diameter of the UNC thread and K is .0000812. Thus, for a 1/4–20 nut, for example:

Min. $P \cdot D = .2175 + .0000812/.02706$ $= .2175 + .0030$ $= .2205''$

Max. $P \cdot D = .2205 + .0036$ $= .2241''$

It will be understood that, except as described above, the form and threading of the nut blank 10 may conform to standard practice as disclosed in said ASME publication.

The special nut blank 10 is compressed precisely across a pair of opposing flats to give it a permanent distortion, but this compression is effected only at the upper portion of the nut so that its threaded hole assumes an oval or elliptical shape at the top and remains essentially round at the bottom. More particularly, the compression is effected by squeezing the nut across the upper portions of the two opposing flats so as to form each of them over its squeezed area with an indentation 16 extending continuously across its upper portion and from the top of the flat down to a line of indentation which in the illustrated lock nut is horizontal shoulder 16a. The indentation 16 extends down from the plane of the top 11a of the nut a distance equal approximately to one-third of the overall height of the nut less the thickness of the flange as measured at a diameter of the flange equal to twice the nominal size of the nut. Thus, this vertical spacing of the lowest extent of the indentation 16 from the top of the nut is at least 0.30D–0.005 inch for nut sizes from 1/4" through 5/8" nominal thread diameter and is at least [0.88D/3]–[0.020/3] inch for nut sizes from 3/4" through 1 1/2" nominal thread diameter. The amount of this compression is also precise, as will be described presently, and is such as to give the nut a prevailing torque which does not exceed that prescribed in Table V of said publication of Industrial Fasteners Institute and which is not less than the breakaway torque "1st Removal" for lock nuts, as prescribed in said last table, after loading the nut to 75% of the proof load of the mating bolt.

After the nut has been compressed across opposing flats, as shown at 16 and described more fully hereinafter, it is given a phosphate black coating or a cadmium plated finish or a zinc coating, although the latter is less preferable. This coating or finish provides adhesion of the subsequent coating of extreme pressure lubricant, especially to the threaded wall of hole 17 and to the washer or bearing face 14 at the undistorted bottom of the nut. The "E.P." lubricant is preferably wax applied by dipping the nut into a wax lubricating solution, such as follows, and then warm air-drying it:

| | Percent |
|---|---|
| Hydrogenated castor oil wax | 5 |
| Paraffin | 5 |
| Stearic acid | 3 |
| Lanolin | 3 |
| Sodium nitrite | 1 |
| Emulsifier | 3 |
| Water | 80 |

These coatings make the nut dry to the touch and provide it with a uniform extreme pressure lubricant. The "E.P." lubricant, in combination with the special shape and dimensioning of the nut, produces more uniform prevailing torque characteristics and more uniform clamp load characteristics at a given torque, as compared with prior nuts of this type.

As previously mentioned, the threaded central hole 17 in the nut is generally elliptical at its upper end, having a minor axis 18 and a major axis 19. This elliptical shape is the result of compressing or squeezing the pair of opposed flats toward one another at their upper portions 16—16, over the depth previously stated, beyond the elastic limit of the nut blank to provide a permanent distortion of the blank with the sides of the opening on minor axis 18 pushed toward one another and with the sides of the opening on major axis 19 pushed away from one another. The extent of this permanent distortion, which determines the width along the minor axis 18 at the top of the hole, is such as to provide the nut with a friction locking torque of $115D^{2.4}$ to $820D^{2.5}$ on its mating screw within the dimensional tolerances of its class of fit, in which D equals the nominal diameter of the mating screw and the result is pound-inches of torque. This value may be readily determined by screwing the lock nut on a mating screw, such as a bolt, with a conventional torque wrench. In accordance with the preferred practice, the width of the top of the opening along the minor axis 18 to product the specified locking torque will be the width at the bottom of the opening reduced by .017 to .030 inch for nut sizes of 1/4" through 5/8" nominal diameter and reduced by .025 to .040 inch for nut sizes of 3/4" through 1 1/2" nominal diameter. The width of the top of the opening along minor axis 18 is measured from crest to crest of the first or uppermost full thread in the hole; and the width at the bottom of the opening is determined by measuring across a diameter from crest to crest of the last or lowermost full thread in the hole. These measurements may be made with a vernier caliper or a tapered plug gauge.

FIG. 4 illustrates the use of the lock nut when screwed tightly onto a bolt 12 to secure the pieces of work 20 and 21. When the nut is applied to the bolt, it may be screwed on part way freely by hand since the lower part of the nut is essentially undistorted. As the nut is screwed further onto the bolt, the distorted upper portion of the nut tends to assume its original undistorted form due to the resiliency of the wall of the nut. The bolt threads force the compressed sides of the nut against the spring action of the distorted upper portion of the nut. As indicated in the drawing, the threads along the inwardly distorted sides on minor axis 18 of the nut tightly engage their mating threads on the bolt. This spring action causes the nut to grip opposite sides of the bolt and by reason of the amount of the distortion to make a strong friction pressure contact on the top flanks as well as on the bottom flanks of the bolt threads. Accordingly, the nut not only grips the bolt tightly but creates an additional friction area on the threads by pressing against the upper sides ts well as the lower sides of the bolt threads, even when the nut is tightened against the work.

A type of apparatus suitable for compressing lock nuts in accordance with the present invention is shown in U.S. Patent No. 2,464,729, dated March 15, 1949. The apparatus shown in that patent comprises mechanism for pressing a nut blank between a pair of opposed squeezing rollers which contact the pair of opposing flats only along their upper portion to form compression indents 16—16.

It will be apparent that as a result of the permanent distortion caused by the previously described compression across opposing flats, as shown at 16—16, the truncated cone has an elliptical shape. The upper or reduced end 11a of the truncated cone 11 is in the shape of an ellipse having a width which, as measured along the minor axis 18 between the opposite external edges, approximately equals $(1.20D$ to $1.20D+0.015$ inch) minus .017 to .030 inch for nut sizes of 1/4" through 5/8" nominal diameter and $(1.20D$ to $1.20D+0.015$ inch) minus .025 to .040 inch for nut sizes of 3/4" through 1 1/2" nominal diameter. At the base of cone 11, the conical surface terminates at the vertical flats 13, including the indented portions 16 of the opposing compressed flats. The base of the cone 11 will have a dimension which, as measured across the indented or deformed portions 16—16 in a plane through the base of the cone at the nut corners, is equal to the width across flats at the bottom of the nut minus about .020 to .032. In other words, although the amount of the permanent distortion at the indentations 16—16 is substantially the same for the different nut sizes, it creates at the top of cone 11 a distortion which increases substantially in amount as the nut size increases.

Referring to the new nut in its illustrated embodiment, it will be observed that the annular elliptical surface 11a forming the top of the nut lies in a plane normal to the nut axis and is of substantially uniform width dimension as measured between the inner and outer edges of the annular surface. The maximum height of the cone 11 is the vertical distance from the plane of its reduced end 11a to the upper ends of the corner formed by the flats, as shown at 11b. It will also be observed that the minimum height of the cone 11, as measured from the highest points 11c of the flats to the plane of the top 11a, is at least one-third of the vertical spacing of shoulders 16 from the top 11a of the nut. In fact, this ratio is approximately one-third for the smallest size nuts (¼″) and increases with the nut size. However, the height of the cone is determined essentially by factors previously described, particularly its approximately 45° taper, its external width at the top, and the fact that its conical surface extends downward to the vertical flats having a predetermined spacing between the flats of an opposing pair.

An important feature of the new lock nut, in addition to the bottom flange 14, resides in the fact that the cone 11 occupies at least about the upper third of the nut height above the lowest extent of the indentations 16, and in the fact that distortion of the nut over its substantial height represented by the cone is effected indirectly by compression across opposing flats below, as shown by indents 16. Thus, the new nut provides a variable spring rate over that substantial part of its distorted portion which is represented by cone 11. The cone allows the nut to be distorted a greater amount and yet adjust itself properly on the bolt despite the tolerances or variations in the threads. Because of the extreme pressure lubricant and the resiliency provided by the cone 11, the nut exerts a substantially greater clamp force for a given tightening torque. The new nut also provides a substantially higher yield clamp force, due largely to the amount of distortion, which tilts downwardly the upper threads (at their portions adjacent the minor axis 18) and distributes the clamp load more uniformly over the mating threads of the nut and bolt. The cone 11 is essential also because otherwise, with this greater amount of distortion, the uniformly stiff spring action would cause galling of the threads when the nut is tightened on the bolt.

I claim:

A lock nut of the prevailing torque-type comprising a nut body of resilient material having a hexagonal shape and a circular bottom flange to provide said body with six sides integral with the bottom flange and forming three pairs of opposed vertical flats above the bottom flange, said nut body having a central vertical axis and including an integral upper portion forming an out-of-round truncated cone tapering continuously upwardly from said flats at an angle of approximately 45° relative to said axis, said body having a threaded central hole extending axially through the body from top to bottom and adapted to receive a mating bolt, said hole being circular at the bottom and partly defining at the reduced upper end of the cone an out-of-round annular surface in a plane normal to said axis, said annular surface forming the top of the nut body and being of substantially uniform dimension as measured between the inner and outer edges of the annular surface, said body having at the bottom an enlarged annular bearing face formed in part by said flange and surrounding the hole in a plane normal to the nut axis, the upper surface of said bottom flange sloping downward and outward at an angle of about 25 degrees relative to said bearing face, said flange having a minimum outer diameter of about 2D, where D is the nominal diameter of said mating bolt, the minimum thickness of the flange, as measured at said minimum diameter, being 0.16D, the height H of the nut body as measured between the plane of said upper end of the cone and said bearing face being at least about as follows, in inches:

| D | 3/16 | 7/32 | 1/4 | 5/16 | 3/8 | 7/16 | 1/2 | 9/16 | 5/8 |
|---|------|------|-----|------|-----|------|-----|------|-----|
| H | .242 | .265 | .274 | .339 | .396 | .460 | .522 | .584 | .646 | said minimum height being increased by the extent to which said flange thickness exceeds said minimum of 0.16D, the opposed vertical flats of one of said pairs each having an indentation extending continuously across the upper portion of the flat, the lowest extent of said indentation being spaced below the plane of said upper end of the cone a distance equal approximately to one-third of the height of the nut body less the thickness of the flange at said minimum diameter, said cone and the threaded hole portion within the cone having in cross-section and at the top the shape of an ellipse with its major axis parallel to said indented flats and disposed in a vertical plane intersecting a pair of opposed vertical corners formed by the other flats, the minor axis of said ellipse being perpendicular to said major axis, said cone and the nut body between said indentations defining a threaded hole which is out-of-round by an amount sufficient to provide the nut with a friction locking torque of $115D^{2.4}$ to $820D^{2.5}$ on a mating screw within the dimensional tolerances of its class of fit, the conical surface of said cone extending from said reduced upper end to said vertical flats, the minimum height of the cone, as measured from the plane of its upper end to the highest points of the flats, being at least one-third of said spacing of said lowest extent of said indentation, and a coating of extreme pressure lubricant on the threads of said hole and said bearing face.

References Cited by the Examiner

UNITED STATES PATENTS

| D. 22,813 | 9/1893 | Rouse | 151—21 |
| D. 157,484 | 2/1950 | Gade | 85—32 |
| 134,649 | 1/1873 | Delfer | 85—32 |
| 3,198,230 | 8/1965 | Stover | 151—21 |
| 3,216,302 | 11/1965 | Kluth | 151—21 |

FOREIGN PATENTS 898,106   6/1962   Great Britain

CARL W. TOMLIN, *Primary Examiner.*

M. PARSONS, Jr., *Assistant Examiner.*